United States Patent [19]

Bodge et al.

[11] Patent Number: 4,499,762
[45] Date of Patent: Feb. 19, 1985

[54] WATER WAVE MONITOR

[75] Inventors: Kevin R. Bodge; Robert G. Dean, both of Gainesville, Fla.

[73] Assignee: University of Delaware, Newark, Del.

[21] Appl. No.: 514,374

[22] Filed: Jul. 15, 1983

[51] Int. Cl.³ .............................................. G01L 9/00
[52] U.S. Cl. ................................................ 73/170 A
[58] Field of Search .................... 73/170 A, 299, 300, 73/301

[56] References Cited

U.S. PATENT DOCUMENTS

| 2,637,999 | 5/1953 | Klebba | 73/170 A |
| 2,766,622 | 10/1956 | Johnson | 73/170 A |
| 2,773,385 | 12/1956 | Johnson | 73/301 |
| 3,113,285 | 12/1963 | Edwards | 340/2 |
| 3,225,593 | 12/1965 | Richard | 73/170 |
| 3,367,181 | 2/1968 | Adler | 73/170 |
| 3,449,950 | 6/1969 | Dale et al. | 73/170 |
| 3,899,668 | 8/1975 | Tucker, Jr. | 73/170 A |
| 3,910,111 | 10/1975 | Mott et al. | 73/170 A |
| 3,972,231 | 8/1976 | Richardson | 73/170 |
| 4,202,034 | 5/1980 | Bowditch et al. | 364/420 |

FOREIGN PATENT DOCUMENTS 197195 9/1965 U.S.S.R. .
295973 7/1969 U.S.S.R. .

Primary Examiner—Donald O. Woodiel

[57] ABSTRACT

Method and apparatus for submerged service water wave monitoring utilizing a plurality of differential pressure gages in association with an absolute pressure gage developing, together, wave height, wave direction and frequency data.

5 Claims, 7 Drawing Figures

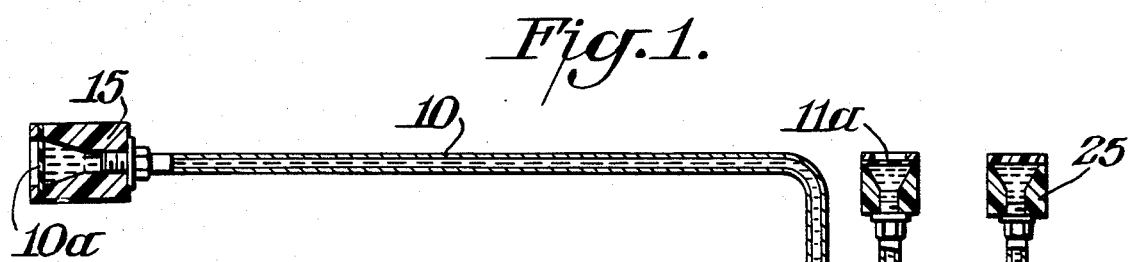
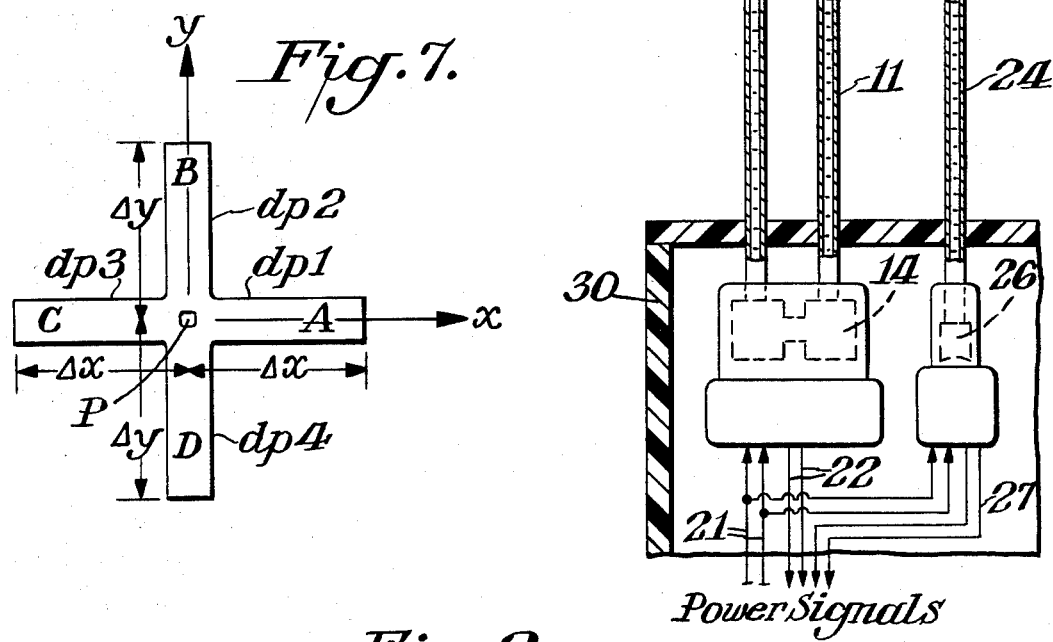
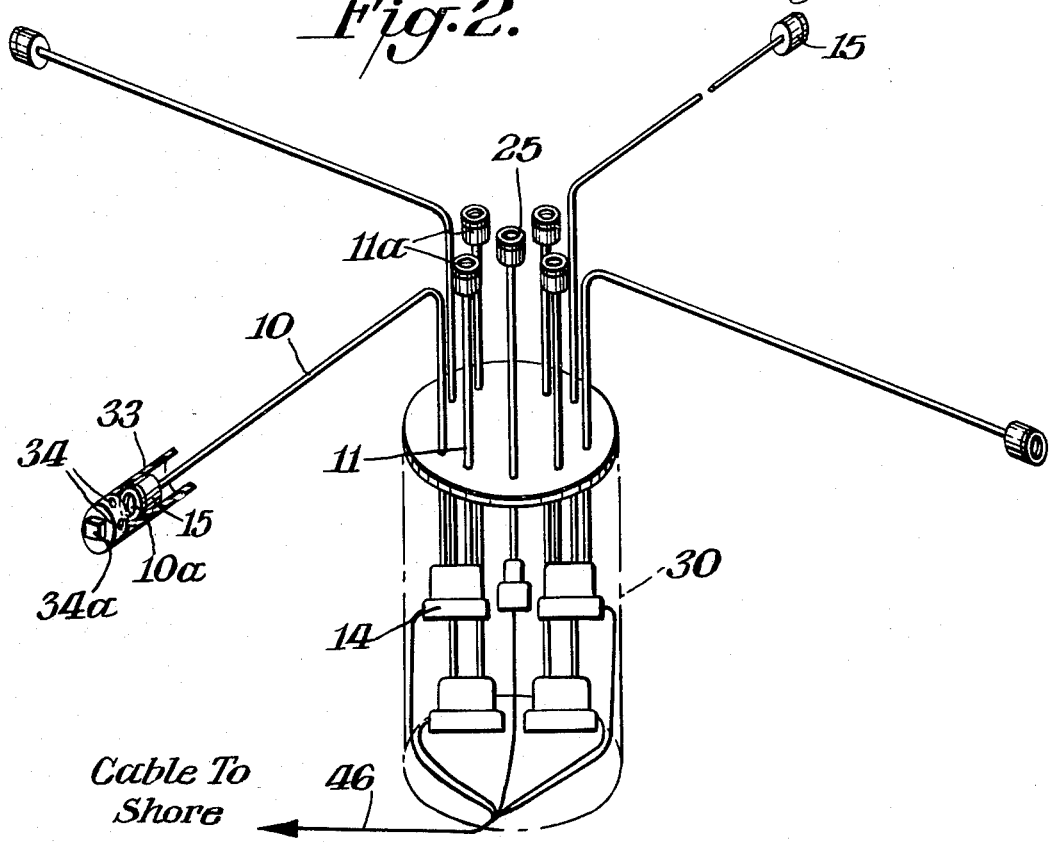

WATER WAVE MONITOR

BACKGROUND OF THE INVENTION

The directional characteristics of ocean surface and other water waves have been measured by submerged arrays of pressure-sensing transducers in which there is a general estimate of water surface slope obtained by subtracting the pressures sensed under the waves at two or more points and dividing by the distance between the sensors. However, the difference in pressure between any two sensors of a typical array is generally very small compared to the large absolute pressures that the transducers are required to record. The water surface slope has accordingly been calculated by subtracting two very large numbers in order to generate a very small number. This has contributed inaccuracies to measurements of wave characteristics.

SUMMARY OF THE INVENTION

This invention utilizes arrays of differential pressure transducers which are capable of generating much more accurate water surface slope measurements while retaining a considerably smaller and more compact instrument size.

The apparatus of this invention comprises at least two submerged differential pressure gages disposed in a generally horizontal plane in proximity to a submerged sensor measuring water surface displacement, the differential pressure gages being aligned at an angle in the range of about 20° to about 90° with respect to each other, each differential gage preferably constituting a liquid-filled tube having the terminal ends sealed off by pressure-transmitting membranes and provided with a transducer measuring the differential pressure across said membranes, and means responsive to the differential pressure gages and the sensor measuring water surface displacement developing measures of wave height, direction and frequency.

BRIEF DESCRIPTION OF THE DRAWINGS

FIG. 1 is a partially schematic side elevation view of a single differential pressure gage with its associated pressure transducer and an absolute pressure gage serving as the sensor measuring water surface displacement;

FIG. 2 is a partially schematic cut away perspective view of a preferred embodiment of apparatus according to this invention utilizing four differential pressure gages having outboard sensors disposed 90° angularly one from another and inboard sensors nested around a single absolute pressure gage;

FIG. 7 is a top plan layout illustrating a coordinate system applicable to the apparatus of FIGS. 2 and 5.

DETAILED DESCRIPTION

A wide variety of differential pressure gage designs can be utilized with this invention, including electrical capacitance types as well as pneumatic, mechanical and others; however, hydraulic designs, such as that hereinafter described in detail, are preferred because of the elimination of electrical circuit integrity problems, simplicity of design and established ruggedness under trying environmental conditions.

Figure 3:
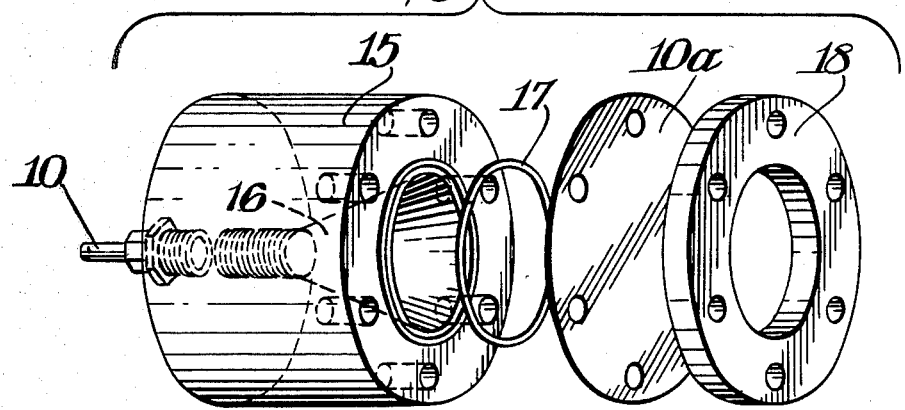
FIG. 3 is an exploded view of a sensor diaphragm and its mounting housing.

Referring to FIGS. 1, 2 and 3 particularly, the several differential pressure gages (DPG) of this invention are identical in design, DPG #1 only being detailed in FIGS. 1 and 3.

Each differential pressure gage comprises an outboard liquid-filled tube 10 and an inboard liquid-filled tube 11 which tubes are each provided at their terminal ends with pressure-sensing membranes 10a and 11a, respectively, the tube pairs being connected in opposition at their inboard ends to individual transducers 14 incorporating diaphragms converting the differential pressure signals across the membrances to electrical analog voltage signals.

Tubes 10 and 11 can conveniently be fabricated from $\frac{1}{4}''$ O.D. ($\frac{1}{8}''$ I.D.) polytetrafluoroethylene tubing and the liquid filling can be 50% alcohol-water solution.

As detailed in FIG. 3, the sensor membranes, e.g., 10a, 11a, etc., are supported in leak-tight acrylic polymer tube connector housings 15 provided with outward facing funnel-shaped supports 16 necking down to the tubes 10, 11. The sensor membranes 10a, 11a, etc., can conveniently be fabricated from a flexible elastomer, e.g., 13 mil du Pont Fairprene ®, a durable nylon material coated with neoprene, flexible normal to the fabric, which is assembled to housing 15 by sandwiching between rubber O-ring 17 and outwardly facing screw-attached 90-10 Cu—Ni ring 18. The diameter of elastomer membranes 10a, 11a, etc., exposed by ring 18 is, typically, $1\frac{5}{8}''$ for each membrane.

The differential pressure transducers 14 are, typically, Setra Systems Model 228, which are high line, low differential wet—wet capacitance type designs having infinite resolution and a ±0.5 psid range. Transducer noise is rated as below 100 microvolts RMS. The differential transducers require 28 volts DC nominal excitation supplied via leads 21 and have a 0-5 volt positive signl output delivered via leads 22.

Each apparatus is provided with a sensor measuring water surface displacement, and this is preferably an absolute pressure gage (APG) which embodies a single liquid-filled tube 24 of the same size and material as the DPGs terminating at its free end in a sensor membrane of the same size and design as the DPGs denoted generally at 25 connected to transducer 26. Transducer 26 can typically be a Setra Systems Model 205-2 of 50 psia range operating on 28 volt DC nominal excitation, conveniently supplied via leads 21, with 0-5 volt positive signal output delivered via leads 27.

Figure 5:
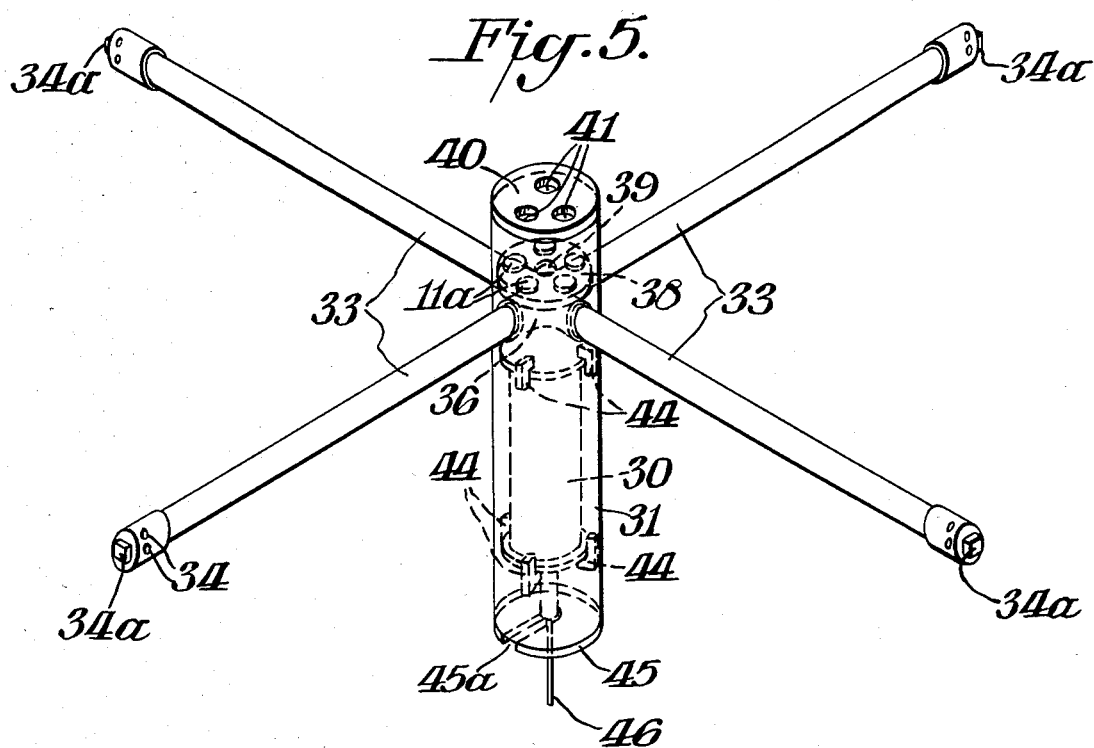
FIG. 5 is a partially schematic perspective view of the gage assembly housing of the apparatus of FIGS. 2 and 4, details of differential pressure gage tubing being omitted.

As shown in FIG. 2 particularly, all of the pressure transducers and their associated electronics are housed within water-tight cylinder 30, which is supported in upright position within fuselage 31 (FIG. 5).

Figure 4:
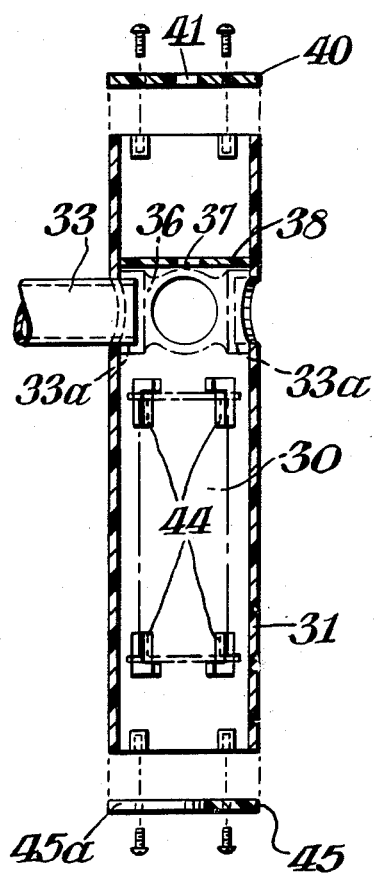
FIG. 4 is a cross-sectional side elevation view of the fuselage accommodating the inner ends of the support arms and housing the inboard sensors and instrumentation of the apparatus of FIG. 2.

Referring to FIGS. 2, 4 and 5 particularly, the outboard housings 15 are generally oriented, protected and supported by mounting them individually within separate rigid tubular arms 33 aligned 90° angularly one from another in a common horizontal plane. Arms 33 are, conveniently, 3.5" outside diameter (3.0" I.D.)

polyvinyl chloride tubes, 52" long and are preselected to generally conform with the length scales of the overlying waves. By this is meant the range of wavelengths in study. Thus, a 52" long gage readily measures 20 ft. waves (or greater) at a typical 20 ft. submersion depth. The outboard membrane sensors, such as 10a, are disposed near the outboard ends of arms 33, where they are maintained against longitudinal movement by set-screw attachment of their housings 15 (not shown); however, sufficient clearance is afforded to flood the interiors of the arms. As shown particularly in FIG. 2, further protection of sensor membranes 10a is afforded by mounting them well within the outboard ends of arms 33, which are sealed off by pipe plugs 34a. Pressure communication with the outside water environment is maintained via a plurality of radial through passages 34, typically 11/16" diameter.

Arms 33 provided with longitudinal slots 33a permitting free passage of DPG tubes 10, etc., into the fuselage 31 are fixedly attached to fuselage 31 by a conventional polyvinyl chloride pipe junction denoted schematically in broken line representation at 36, FIG. 4. All five of the inboard horizontal sensor membranes 11a, 25, etc., (see also FIG. 5) are supported at a common plane in drilled-through recesses 37 provided in transverse plate 38 attached to the inside of the upper end of fuselage 31. Plate 38 is drilled through at a number of points, such as 39, to flood the lower fuselage interior. The top end of fuselage 31 is closed off with a screw-attached polymeric plate 40 preventing intrusion of large sea animals while still preserving free open communication with the outside water environment via drilled holes 41.

Polyvinyl chloride brackets 44 support cylinder 30 in fixed position within fuselage 31, which latter is closed off at the bottom end by a polymeric plate 45 cut radially with passage 45a (FIG. 5) to permit ready ingress of power-signal cable 46 connecting the apparatus with a shore station for signal analysis and power supply.

Figure 6:
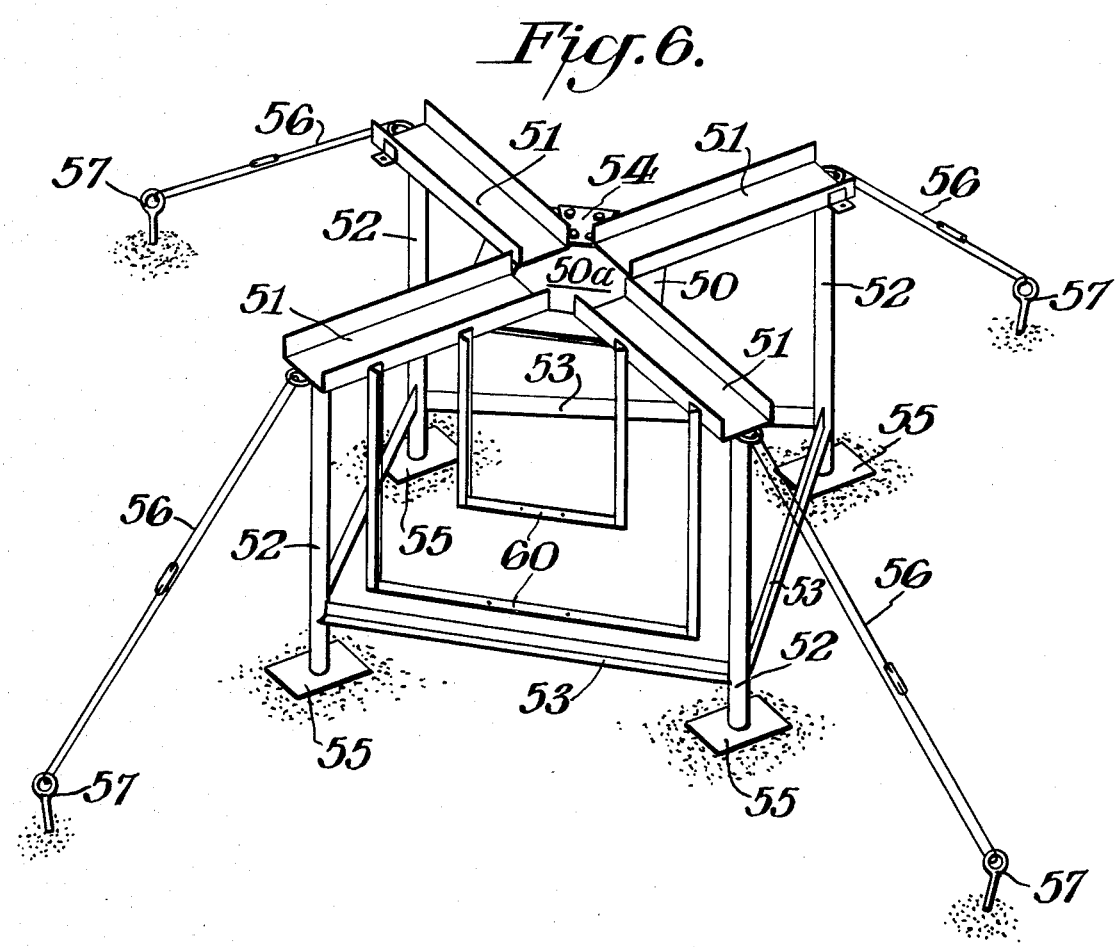
FIG. 6 is a partially schematic perspective view of a preferred design of support cradle for the apparatus of FIGS. 2, 4 and 5.

The complete gage assembly for FIG. 5 is supported in a cradle such as that shown in FIG. 6. The cradle is conveniently constructed of a centrally apertured ¾" thick steel plate 50 to which is welded four steel channels 51, typically 4"×5.4" size, disposed angularly 90° apart, the whole being supported on four 40" long vertical 2" steel pipe legs 52 tied together by 1"×1"×⅛" angle steel stringers 53. A bolt-attached removable entry plate 54 is provided in plate 50 for convenient passage of power-signal cable 46. Onto the base ends of legs 52 are welded thin steel foot plates 55 to reduce burial into the sea floor. The cradle is secured to the bottom using four 5/16" galvanized steel chains 56 attached to the undersides of channels 51, each secured at its outboard end to individual screw anchors 57 secured into the sea floor.

The instrument sub-assembly, within its protective housing consisting of radial arms 33 and fuselage 31 (FIG. 5), is mounted on the cradle of FIG. 6 by depending fuselage 31 vertically downwardly through the central aperture 50a and the arm 33 within individual channels 51. Arms 33 are made fast to the cradle with heavy electrical cable ties.

It is preferred to provide some slack power and data delivery cable at the cradle, facilitating disconnection of the apparatus from the cable if maintenance work is occasionally preformed by surface vessel. In a typical installation, an eighty foot length of cable connecting between the monitor apparatus and the main power-data delivery cable running into shore can be coiled within a 9"×18" plexiglass service box (not shown) supported on hangers 60 weld-secured to adjacent channels as shown in FIG. 6.

Attaching plates and rings (not shown) are welded at convenient points throughout the cradle of FIG. 6 for buoy markers, flotation devices, pingers, diver assist lines and weights to balance the asymmetrically placed service box if necessity requires.

ANALYSIS OF DATA TO ACHIEVE DIRECTIONAL WAVE INFORMATION

Referring to FIG. 7, there is portrayed a vertical plan view of a horizontal coordinate system for directional wave data analysis according to this invention.

The apparatus as hereinbefore described reliably senses the total pressure P over time at the center of the instrument and simultaneously the x-axis slopes of pressure dP/dx at A and C and the y-axis slopes of pressure dP/dy at B and D. It is known that the fluctuations of the total pressure P over time are related to the water surface displacement η(x,y,t) where t=time at a point (x,y) here corresponding to the center of the instrument through a linear pressure response function such that $$\eta(x,y,t) = \frac{P - \gamma d}{\gamma K_p} \quad (1)$$

where
P=total pressure over time at center of apparatus
η=water surface elevation
x, y are X-axis, Y-axis coordinates
t=time
where
γ=specific weight of seawater
d=mean water column height above the sensor 25

$$K_p = \frac{\cosh k(h - d)}{\cosh kh}$$

and k=wavenumber=2 π/wavelength
h=water depth.

It is also known that the pressure gradients in the x direction, dP/dx, at A and C are related to the water surface slopes $\eta_x(x,y,t)$ where (x,y) correspond to A and C, respectively, through a linear differential pressure response function such that $$\eta_x = \frac{dP/dx}{\gamma K_p k \cos\theta} \quad (2)$$

and that dP/dy at B and D are related to $\eta_y(x,y,t)$ where (x,y) correspond to B and D, respectively, such that $$\eta_y = \frac{dp/dy}{\gamma K_p k \sin\theta} \quad (3)$$

where
θ=wave direction measured counter-clockwise froom the x=axis, and
$\eta_x, \eta_y$=water surface slopes in the x and y directions, respectively.

The directional analysis procedure follows directly from the well-known and accepted methods of Longuet-Higgins, Cartwright, and Smith (1963) as detailed in "Observations of the Directional Spectrum of Sea Waves Using the Motions of a Floating Buoy," *Ocean Wave Spectra, Proceedings of a Conference,* Prentice- Hall, Inc., Englewood Cliffs, N.J.; 1963. The water surface displacement is expressed in terms of the complex directional amplitude spectrum, $F(\sigma,\theta)$, as:

$$\eta(x,y,t) = \int_{-\infty}^{\infty} \int_{0}^{2\pi} F(\sigma,\theta)e^{i(\sigma t - k_x x - k_y y)} d\theta d\sigma \quad (4)$$

where
$\sigma$ = frequency
$k_x = k \cos \theta$, wavenumber in the x-direction
$k_y = k \sin \theta$ = wavenumber in the y-direction and $i = \sqrt{-1}$.

The water surface slope is accordingly expressed:

$$\eta\begin{pmatrix} x \\ y \end{pmatrix}(x,y,t) = \int_{-\infty}^{\infty} \int_{0}^{2\pi} -ik \begin{bmatrix} \cos\theta \\ \sin\theta \end{bmatrix} F(\sigma,\theta)e^{i(\sigma t - k_x x - k_y y)} d\theta d\sigma \quad (5)$$

Information providing a partial description of the directional energy spectrum $S(\sigma,\theta)$, (equal to $|F(\sigma,\theta)|^2$), is contained in the auto- and cross-spectra of the water surface displacement and slope terms. These spectra are obtained through the Fast Fourier Transform (FFT) procedures using:

$$S_{\eta\eta}(\sigma) = \int_{0}^{2\pi} |F(\sigma,\theta)|^2 d\theta \quad (6)$$

$$S_{\eta\eta_x}(\sigma) = -ik \int_{0}^{2\pi} \cos\theta |F(\sigma,\theta)|^2 d\theta \quad (7)$$

$$S_{\eta\eta_y}(\sigma) = -ik \int_{0}^{2\pi} \sin\theta |F(\sigma,\theta)|^2 d\theta \quad (8)$$

$$S_{\eta_x\eta_y}(\sigma) = k^2 \int_{0}^{2\pi} \sin\theta \cos\theta |F(\sigma,\theta)|^2 d\theta \quad (9)$$

$$S_{\eta_x\eta_x}(\sigma) = k^2 \int_{0}^{2\pi} \cos^2\theta |F(\sigma,\theta)|^2 d\theta \quad (10)$$

$$S_{\eta_y\eta_y}(\sigma) = k^2 \int_{0}^{2\pi} \sin^2\theta |F(\sigma,\theta)|^2 d\theta \quad (11)$$

The directional spectrum at a frequency $\sigma$ is expressed as a truncated Fourier series in terms of the wave direction $\theta$:

$$S(\sigma,\theta) = a_0 + \sum_{n=1}^{N} (a_n \cos n\theta + b_n \sin n\theta) \quad (12)$$

The Fourier Coefficients are determined in the usual manner as:

$$a_0 = \frac{1}{2\pi} \int_{0}^{2\pi} S(\sigma,\theta) d\theta \quad (13)$$

$$a_n = \frac{1}{\pi} \int_{0}^{2\pi} S(\sigma,\theta) \cos n\theta \, d\theta \quad (14)$$

$$b_n = \frac{1}{\pi} \int_{0}^{2\pi} S(\sigma,\theta) \sin n\theta \, d\theta \quad (15)$$

The first five directional Fourier coefficients are obtainable from the auto- and cross-spectra, Eqs. (6) through (11):

$$a_0 = \frac{1}{2\pi} S_{\eta\eta}(\sigma) \quad (16)$$

$$a_1 = \frac{-1}{i\pi k} S_{\eta\eta_x}(\sigma) \quad (17)$$

$$a_2 = \frac{1}{\pi k^2} [S_{\eta_x\eta_x}(\sigma) - S_{\eta_y\eta_y}(\sigma)] \quad (18)$$

$$b_1 = \frac{-1}{i\pi k} S_{\eta\eta_y}(\sigma) \quad (19)$$

$$b_2 = \frac{2}{\pi k^2} S_{\eta_x\eta_y}(\sigma) \quad (20)$$

If two measurements each are accurately made of $\eta_x$ and $\eta_y$, that is at A and C and at B and D, respectively, then it would be possible to generate the additional directional Fourier coefficients $a_3$ and $b_3$ using the cross-spectra of water surface slope and curvature along each of the axes X and Y assuming that the curvature terms could be developed through the subtraction of simultaneous pressure-slope signals from two collinear differential pressure gauges.

The directional Fourier coefficients as calculated from the data are utilized in Equation 12 which is evaluated from $\theta = 0°$ to $360°$ in small increments, conveniently 2° to 5°, for any wave frequency or frequencies of interest, generally being those frequencies which contain greater energy relative to the other wave frequencies present. The result is a distribution of the wave energy over the compass for some desired wave frequency or frequencies when the angle has been adjusted with respect to the measured orientation of the instrument relative to true north.

It is possible to develop the first 11 directional Fourier coefficients with the apparatus as described herein using a technique suggested in the literature by Borgman (1969) detailed in "Directional Spectra Models for Design Use," *Proceedings, Ocean Technology Conference*, Houston, Tex., 1969. An arrangement of the apparatus such that two arms remain collinear whereas the other two are non-collinear in the same general horizontal plane as the former two would permit the calculation of up to the first 15 directional Fourier coefficients using the technique suggested by Borgman. A greater number of accurate coefficients generates a more accurate directional description of the waves. Directional wave monitors presently used in the art commonly generate the first five directional Fourier coefficients.

The data process is handled in the FORTRAN language using straight-forward programming and a conventional DEC-10 computer, which, accordingly, are not further described herein.

WAVE TANK AND FIELD EVALUATION OF APPARATUS

A prototype of the apparatus according to this invention hereinbefore described was submerged in a long tank of water equipped with a mechanical wavemaker operated by the United States Army Corps of Engineers Coastal Engineering Research Center, Fort Belvoir, Va. The apparatus was oriented in a first position such that the arm corresponding to DPG #3 made an angle, as measured by divers, of approximately 55° with the direction of wave travel and then in a second position such that the same arm made an angle of approximately 35° with the direction of wave travel. The inverse cosine of the ratio of the envelope, or maximum, of the differential pressure signal reported by the DPG #3 transducer, and recorded on a strip chart recorder, to the maximum differential pressure which would be expected along the direction of wave travels, as calculated by stream function wave theory represents the angle which the DPG #3 arm made with the direction of wave travel; i.e., $$\theta = \cos^{-1}\left[\frac{|dP/dx|DPG\ \#3\ \text{envelope}}{|dP/ds|\text{calculated maximum}}\right] \quad (21)$$

Stream function wave theory developed by Dean (1974) as detailed in "Evaluation and Development of Water Wave Theories for Engineering Application, Volumes I and II," Coastal Engineering Research Center Special Report No. 1; Nov., 1974, is widely accepted as accurate for non-linear or non-sinusoidal waves, and was utilized because of the highly non-linear appearance of the waves produced by the mechanical wavemaker. The angle $\theta$ as calculated by (21) for the first orientation tested was 51.3° compared to the 55° angle as approximated by the divers, and 35.4° as compared to the 35° angle as approximated by the divers for the second orientation tested.

An experimental field installation of apparatus according to this invention as hereinbefore described was made in the early summer of 1982 on the seabed of the Atlantic Ocean at a mean water depth of 20 feet at a distance of 1800 feet seaward of the shoreline of the United States Army Corps of Engineers Coastal Engineering Research Center Field Research Facility, Duck, N.C. The orientation of the instrument with respect to magnetic north was determined by temporarily mounting underwater compasses upon the arms of the apparatus and correcting the compass readings against the effects of the metal mass of the apparatus. The compass headings of the respective DPG arms were: #1, 241.82°; #2, 151.82°; #3, 61.82°; and #4, 331.82° as further corrected to true north using the 1982 value of the variation for Cape Hatteras, N.C. The signals of two of the differential pressure gauges, #1 and #4, oriented at approximate 90° to one another were considered as unacceptable because of observed intermittent high frequency noise and signal drift. The redundancy of DPG #3 to #1 and of DPG #2 to #4 permitted the effective collection of directional data despite the uncertain accuracy of two of the orthogonal differential pressure gauges. The signals of the two fully functioning differential pressure gauges oriented at approximate 90° angles to one another were analyzed in conjunction with the signals of the absolute pressure gauge as described herein and the calculated dominant wave direction was compared to estimates of the dominant wave direction as recorded by photographs of a high-frequency radar screen operated by the Field Research Facility on site. Comparison of some data is shown in Table I. Resolution is approximately ±2° for the radar screen. Estimates of the significant wave height and dominant ocean wave period as obtained from the analysis of signals of the absolute pressure gauge of the apparatus were compared to significant wave height and period estimates obtained from the analysis of signals of a conventional Baylor wave gauge operated by the Facility which measures the change in impedance of a water surface-piercing radio frequency transmission line due to water surface deflections. This comparison is also shown in Table I. The apparatus as described has functioned accurately and continuously from the date of the installation to the present.

TABLE I

COMPARISON OF DPG RESULTS WITH FRF OBSERVATIONS
8 June–11 June, 1982

| DATE | TIME | | DPG | FRF OBSERVATIONS |
|---|---|---|---|---|
| 6/8 | 0700 | dirxn | 59° | 58°[a] (50°)[b] |
| | | $H_{sig}$ | 1.39 | 1.41[c] |
| | | period | 8.23 | 8.00[c] |
| 6/9 | 0700 | dirxn | 67° | 68°[a] (50°)[b] |
| | | $H_{sig}$ | 1.34 | 1.33[c] |
| | | period | 9.44 | 9.66[c] |
| 6/10 | 0700 | dirxn | 65° | 66°[a] (55°)[b] |
| | | $H_{sig}$ | 1.23 | 1.56[c] |
| | | period | 10.19 | 10.56[c] |
| 6/11 | 0700 | dirxn | 73° | 69°[a] (60°)[b] |
| | | $H_{sig}$ | 1.32 | 1.53[c] |
| | | period | 11.07 | 10.89[c] |

Notes:
"dirxn" listed is the principal direction (peak energy), TRUE NORTH, from which the waves travel.
"$H_{sig}$" is the significant wave height in meters.
"period" corresponds to the frequency band of greatest energy.
[a]CERC Radar (±2°)
[b]Visual estimate from the end of the pier
[c]CERC Baylor Gauge near the end of the pier It will be understood that, while four differential pressure gages are preferred, as shown in FIG. 7, one orthogonal pair, e.g., C and D (or A and B) is, in fact, redundant, providing a safety factor for mischance sometimes encountered in ocean environments.

Moreover, while orthogonal gage dispositions are preferred, the relative angular dispositions of coacting differential gages can be anywhere in the range of about 20° to about 90°.

What is claimed is:

1. A submerged service water wave monitoring apparatus comprising a device provided with a point sensor responsive to water surface displacement fitted with a pressure-to-electric transducer, and at least two differential pressure gages each having a first sensor disposed in a generally common horizontal plane in proximity with said point sensor and each having a second sensor disposed in said generally common horizontal plane spaced apart from said first sensor a distance preselected to generally conform with the length scales of the overlying waves and sufficient to permit measurement of pressure gradients therein, the angular separation of said gage sensor-to-sensor linear spacing being about 20° to about 90° with respect to each other, each said differential pressure gage being provided with a pressure-to-electric transducer, and means responsive to the output signals of said point sensor transducer and said differential pressure gage transducers developing measures of wave height, direction and frequency.

2. A submerged service ocean gravity wave monitoring apparatus according to claim 1 incorporating four differential pressure gages, each pair of said gages being disposed in generally straight alignment with each other on opposite sides of said point sensor, and said pairs being disposed approximately 90° apart angularly.

3. A submerged service ocean gravity wave monitoring apparatus according to claim 1 wherein said differential pressure gages are of the hydraulic type.

4. A submerged service ocean gravity wave monitoring apparatus according to claim 3 wherein said differential pressure gages of hydraulic type each comprise liquid-filled tubes of sufficient length in accordance with said length scales of said overlying waves and sufficient to permit measurement of said pressure gradients therein, said sensors comprising pressure-sensitive membranes closing off the ends of said tubes, and said associated pressure-to-electric transducer is connected in communication with said liquid-filled tube thereby measuring the differential pressure across said sensors.

5. A method of submerged service water wave monitoring comprising generating an electrical signal at a preselected point which is a function of water surface displacement, generating a pair of electrical signals which are functions of the differential pressures existing in a common horizontal plane between the vicinity of said preselected point and two different points linearly spaced therefrom distances preselected to generally conform with the length scales of the overlying waves and sufficient to permit measurement of pressure gradients therein, the linear alignments between paired points of differential pressure sensing being disposed angularly apart from one another at angles in the range of about 20° to about 90°, and developing from said electrical signals measures of wave height, direction and frequency.

* * * * *